United States Patent [19]
Decker

[11] Patent Number: 6,126,842
[45] Date of Patent: Oct. 3, 2000

[54] LOW-CONCENTRATION OZONE WASTE WATER TREATMENT

[76] Inventor: R. Scott Decker, 702 Crestview Dr., Monett, Mo. 65708

[21] Appl. No.: 09/016,122

[22] Filed: Jan. 30, 1998

[51] Int. Cl.[7] .................................................. C02F 1/78
[52] U.S. Cl. ...................... 210/760; 210/903; 422/186.12
[58] Field of Search .................................... 210/758, 760, 210/903; 422/186.12

[56] References Cited

U.S. PATENT DOCUMENTS 4,545,960  10/1985  Erz et al. ............................ 422/186.12
5,181,399  1/1993  Engel et al. ........................ 422/186.12

*Primary Examiner*—David A. Simmons
*Assistant Examiner*—Betsey J. Morrison
*Attorney, Agent, or Firm*—Spencer Fane Britt & Browne LLP

[57] ABSTRACT

A method is provided of reducing the biochemical oxygen demand (BOD), chemical oxygen demand (COD), ammonia and total nitrogen (TKN) of wastewater comprising the injection of a gas mixture of a low-concentration of ozone gas in oxygen into a wastewater stream with mixing to provide a reduction in the wastewater pollutants.

4 Claims, 3 Drawing Sheets

| O₃/O₂ SYSTEM | MONTH | AVE BOD | AVE NFR |
|---|---|---|---|
| | | | |
| not used | January | 308 | 47 |
| not used | February | 218 | 33 |
| not used | March | 238 | 41 |
| not used | April | 202 | 32 |
| not used | May | 278 | 43 |
| not used | June | 306 | 26 |
| not used | July | 241 | 35 |
| not used | August | 411 | 66 |
| *start use* | September | 185 | 45 |
| *in use* | October | 183 | 31 |
| *inuse* | November | 197 | 45 |
| end | | | |

Fig. 2

OZONE TEST RESULTS

| FEB | | | | FEB with Ozone | | | | DAF | | | | DAF with ozone | | | |
|---|---|---|---|---|---|---|---|---|---|---|---|---|---|---|---|
| BOD | COD | TKN | NH3 | BOD | COD | TKN | NH3 | BOD | COD | TKN | NH3 | BOD | COD | TKN | NH3 |
| 2920 | 10300 | | | 1321 | 2876 | 102 | 50.7 | | 804 | 101 | 75 | 551* | 798* | 161* | |
| 3369 | 5810 | | | 1067 | 2320 | 74.7 | 44.5 | | 776 | 79 | 31 | 410* | 674* | 164* | |
| 2070 | 5088 | | | 896 | 2164 | 86.1 | 52.5 | 528 | 880 | 235 | 114 | 701* | 867* | 150* | |
| 3581 | 12200 | | | 1105 | 2648 | | 48.5 | 829 | 1326 | 146 | 35 | 809* | 1020* | 99* | |
| 3372 | 8700 | | | | | | | 656 | 1048 | 171 | | 499 | 864 | 75 | 48 |
| | 6299 | | | | | | | 660 | 1020 | 139 | | 444 | 781 | 70.6 | 53.7 |
| | 4313 | | | | | | | 840 | 1250 | 156 | | 423 | 748 | 82.3 | 64.1 |
| | 6326 | | | | | | | | | | | 390 | 690 | | 68.5 |
| | 6990 | | | | | | | | | | | | | | |
| | 6296 | 200 | 104 | | | | | | | | | | | | |
| | 13616 | 141 | 26.4 | | | | | | | | | | | | |

| Average | | | | | | | | | | | | | | | |
|---|---|---|---|---|---|---|---|---|---|---|---|---|---|---|---|
| 3062 | 7813 | 171 | 65 | 1097 | 2502 | 88 | 49 | 703 | 1015 | 147 | 64 | 439 | 771 | 76 | 59 |

* INDICATES DAY GENERATOR NOT OPERATING

Fig. 3

LOW-CONCENTRATION OZONE WASTE WATER TREATMENT

BACKGROUND OF THE INVENTION

This invention relates to the general area of wastewater processing, and in particular to the use of low concentrations of ozone in oxygen to reduce the biochemical oxygen demand of the wastewater prior to further waste treatment.

In any body of water a small concentration of oxygen is dissolved in the water. The dissolved oxygen (DO) is considered to be one of the most important assets in good water quality for streams, rivers and lakes. The importance of dissolved oxygen in natural bodies of water is based upon the need for fish and other aquatic organisms to breath oxygen. The presence of organic waste in streams, rivers and lakes provides an alternative use or competitive situation for use of the dissolved oxygen.

This competition for oxygen arises from the need for oxygen to be used by bacteria in attacking the organic waste contained in the water. When bacteria metabolize the organic waste found in the lake or stream, the bacteria utilize some of the dissolved oxygen in the body of water to break down the organic materials into simpler compounds such as $CO_2$ and $H_2O$. The bacteria rely on the energy released in such breakdown reactions for their own growth and reproduction.

As the amount of organic waste in a body of water increases the activity of bacteria in the body of water also increases, and the bacterial demand for oxygen increases. This increased consumption of the available dissolved oxygen by the bacteria in metabolizing dissolved organic wastes reduces the dissolved oxygen in the water which is available for fish and other aquatic organisms. In extreme cases bacterial activity in a polluted body of water becomes so great that the dissolved oxygen severely depletes and suffocation of the aquatic organisms occurs.

The tenuous nature of this situation is quickly apparent upon understanding that oxygen is only slightly soluble in water and at 20° C. oxygen is present in water at about only 9 mg/L or 9 ppm. Thus it will be appreciated that due to the slight solubility of oxygen in water, the competition among organisms deriving their oxygen supply from the water is acute.

In the past 30 years increased pollution of streams and water supplies by industrial waste, has made it necessary to monitor streams, rivers and lakes by assessing the amount of dissolved oxygen in the body of water and by determining the consumption requirements for that oxygen by the inhabitants of the water supply. This measuring of oxygen consumption is called the biochemical oxygen demand (BOD) and measures the utilization of available dissolved oxygen in biochemical reactions occurring within a water supply.

As a practical matter, the consumption of oxygen by fish and other large aquatic creatures is not measured by biological oxygen demand. Rather, it is the demand for oxygen exerted by the chemical reactions and the bacteria metabolizing organic materials in the water supply which is determined through BOD measurements. Therefore, biochemical oxygen demand is relied upon to indicate the amount of pollution present in the stream and to indicate the status of the water supply as a life-support system for fish and other aquatic life.

By comparison, a very clean body of water will have a biochemical oxygen demand over a period of five days of about 1 mg/L. This consumption of oxygen in a clean body of water is attributable to bacterial action on the naturally occurring organic materials from decaying leaves and animal wastes. When BOD values for a five-day period, or the "$BOD_5$" value, exceeds 10 mg/L, it is an indication of the presence of sewage pollution in the body of water.

Because it is critical to maintain minimum levels of dissolved oxygen in natural bodies of water and to limit the competition for oxygen so aquatic life is not suffocated, industrial processes which release water into streams and rivers and into water-treatment facilities must be monitored for organic pollution levels. The monitoring of organic pollutants in effluents must be conducted so organic waste in the discharge water does not raise the BOD of the receiving stream to levels which compromise aquatic life.

In gauging the suitability of water for release from an industrial process such as a meat-packing house or food-processing waste from organic processes, it has become the method of choice to measure the biochemical oxygen demand of the process discharge water. When necessary the discharge water can then receive treatment to reduce the organic wastes which will reduce the BOD of the receiving water stream.

Once reduction is achieved in the organic waste which will cause BOD elevation the water can then be safely discharged from the industrial facility and into the receiving stream. In this manner a safe level of dissolved oxygen can be maintained in the receiving stream and harm to the aquatic environment and the indigenous fish and other life existing in the river or stream can be preserved. In the situation in which the industrial water is being discharged into a municipal water treatment facility, a dissolved oxygen level can be maintained which will not harm the bacteria culture present in a water treatment facility.

In practice, industrial organic water waste producers are identified by local water authorities and are provided with a biochemical oxygen demand goal which it must attain for release of the process water into the public waterway. Failure to meet the BOD goals results in fines against the industry by the local water protection authority. Therefore, industries producing wastewater are confronted with finite and specific goals to achieve before wastewater can be released from the plant.

The reasons for failing to achieve the assigned BOD requirements can range from equipment failures during the water processing to the industrial plant concluding that it is less expensive to pay the fine than to treat the wastewater. It may also be the case that the process water is released prematurely and without attaining the BOD goal as the plant is without the means to store wastewater requiring additional treatment.

Therefore it is an object of the present invention to provide a method of reducing the biochemical oxygen demand and chemical oxygen demand and ammonia and total nitrogen of wastewater which is inexpensive to use and which allows the reduction in existing treatment process costs.

It is another object of the present invention to provide an efficient method of reducing biochemical oxygen demand and chemical oxygen demand and ammonia and total nitrogen which can be added onto existing water treatment facilities to supplement the existing treatment process.

It is a primary object of the present invention to provide a method of reducing biochemical oxygen demand through the injection of a mixture of ozone and oxygen gases into the wastewater and where the ozone concentration is sufficiently low so as to avoid the high costs associated with the generation of large quantities of ozone.

SUMMARY OF THE INVENTION

In general, the inventive method comprises the injection of an oxygen and ozone gas mixture into a wastewater supply with the ozone concentration being approximately 3% ozone in about 92% oxygen and with the ozone concentration being less than 4.5%. The remaining gas mixture may be composed inert gases such as nitrogen.

In practice the ozone concentration is achieved by allowing a stream of air, in which the oxygen concentration has been increased to approximately 90–95% to pass through an ozone generator operating at a sufficient level to add from 1% to 3% ozone to the oxygen stream. The ozone/oxygen gas stream is then combined with wastewater having a high biochemical oxygen demand and allowed to interact with the agents in the wastewater responsible for the high biochemical oxygen demand. The action of the ozone/oxygen gas stream on the wastewater reduces the biochemical oxygen demand to substantially lower levels allowing release of the treated water from the plant and into the public waterway while avoiding additional water treatment costs. In addition the method reduces chemical oxygen demand and ammonia and total nitrogen in the wastewater.

The foregoing and other objects are not meant in a limiting sense, and will be readily evident upon a study of the following specification and accompanying drawings comprising a part thereof. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 2 is a table showing biochemical oxygen demand (BOD) data gathered before and after application of the inventive method to a wastewater supply.

FIG. 3 is a table showing biochemical oxygen demand (BOD) and chemical oxygen demand (COD) and ammonia ($NH_3$) and total nitrogen (TKN) data gathered on process wastewater and showing data without ozone treatment and data taken after ozone treatment.

DESCRIPTION OF THE PREFERRED EMBODIMENTS

Figure 1:
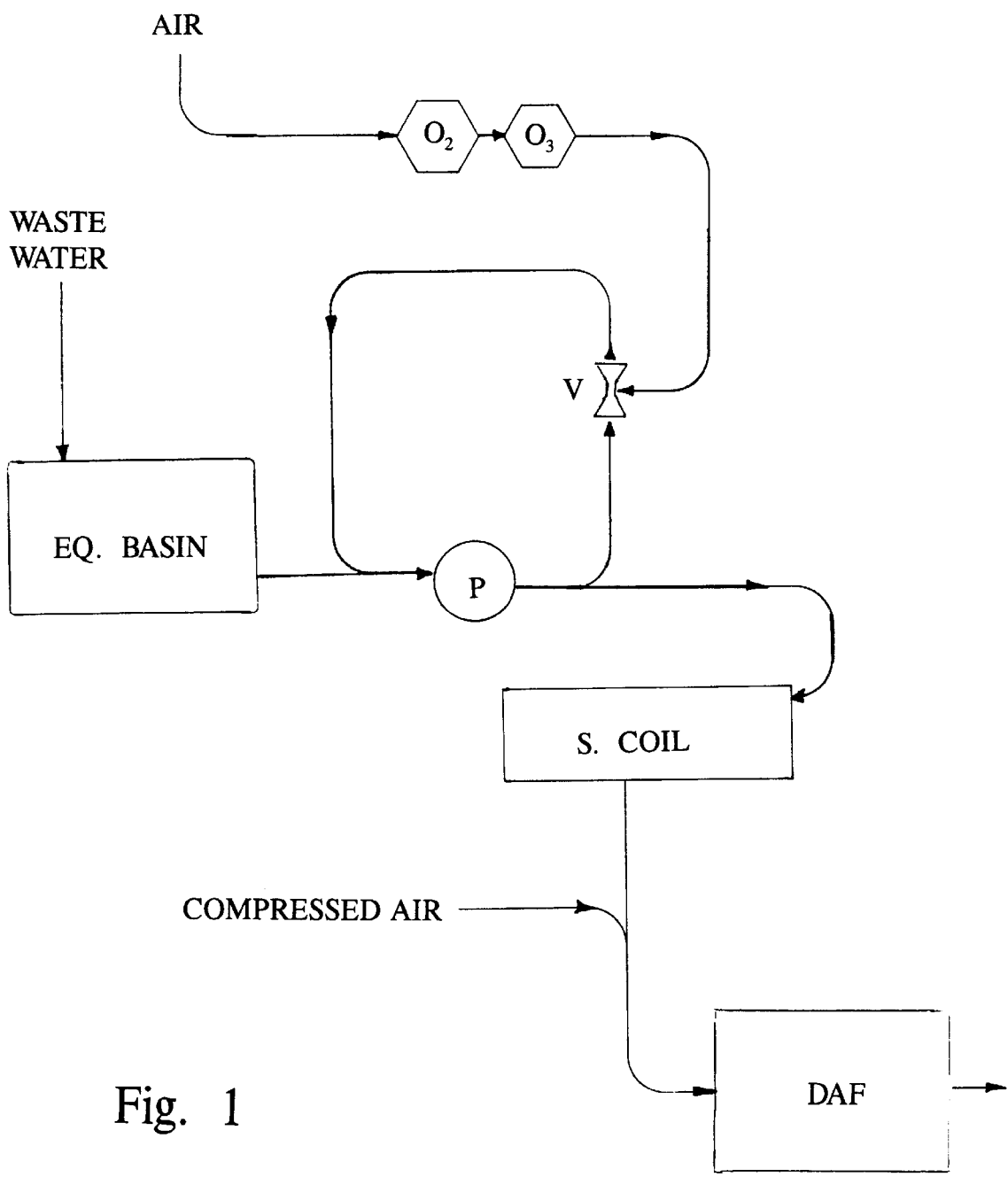
FIG. 1 is a flow chart diagram showing the interrelation and interconnection of the various components of the inventive method.

The inventive method operates to reduce the amount of material which is responsible for the direct or indirect consumption of oxygen in wastewater. As previously described, a principle concern in the treatment of wastewater is the elimination of substances which contribute to the consumption of oxygen dissolved in the water. The oxygen may be consumed by micro organisms during the breakdown of organic waste in the water or the oxygen may be consumed in a number of other chemical reactions which can occur in polluted water. The result in all these cases is the dissolved oxygen in the water is consumed and the water is then unsuitable for supporting aquatic life.

The actual reaction mechanism by which the biochemical oxygen demand and chemical oxygen demand and ammonia and total nitrogen in the wastewater are reduced using the inventive method has not been specifically identified. However, it is believed that the addition of a limited amount of ozone in oxygen serves to efficiently react with the most oxygen-active moieties in the wastewater while avoiding the breakdown or disruption of these molecules into smaller molecules thereby producing additional sites of oxygen reactivity. In addition, it is believed that the ozone enhances the ability of the action of the fluid entrained dissolved oxygen bubbles to attract and adhere to particulates in the solution and to thereby generate precipitates or flocculent particles in the solution which can be induced to rise to the solution surface.

In support of this result it has been observed that when higher concentrations of ozone (greater, generally, than approximately 5%) are used in the treatment of wastewater a negative and detrimental effect from the ozone is actually observed. The introduction of the higher concentration of ozone into the wastewater produces a very large increase in the BOD of the wastewater rather than decreasing the BOD. In this situation the introduction of ozone causes the opposite of the desired result. It is believed that the higher concentrations of ozone act to further split reactive molecules and to thereby produce multiplied sites for oxygen consumption.

Referring now to FIG. 1 an embodiment of the system used to effect the inventive method will be discussed. In the ordinary wastewater treatment method wastewater enters an equalization basin or first equalization basin EQ. BASIN (FIG. 1) from the plant or production facility. In the equalization basin the water is allowed to mix with other water entering the system, to stand and to become a uniform mixture. The equalization basin is generally a holding tank in which the wastewater is first received and in which an initial settling of grit and other large particles and temperature equalization can occur.

In one embodiment of the inventive method, a portion of the wastewater is withdrawn after leaving pump P (FIG. 1) and directed through a venturi tube or venturi injector (FIG. 1) where an ozone and oxygen gas mixture is drawn into, or injected, into the water stream as it passes through venturi tube V. The low-pressure zone created in the venturi as the wastewater passes through the tube draws-in the gas mixture which is connected to the venturi by a line connecting the oxygen concentrator $O_2$ (FIG. 1) to the ozone generator $O_3$ (FIG. 1) and then to the venturi injector V (FIG. 1). Alternatively, the ozone/oxygen gas mixture could be injected into the wastewater stream upon leaving the equalization basin. The method by which the gas mixture is created will be discussed hereinafter.

Once the gas mixture has been introduced into the diverted portion of waste water the diverted portion is recombined with the main body of the wastewater. The recombination is conducted before the main water stream enters transfer pump P (FIG. 1). In this manner the action of pump P serves to mix the gas mixture into the wastewater. Upon being pumped from the equalization basin, and mixing with the gas mixture, the wastewater is allowed to mix further together by passing the water through a series of coils. These coils are sometimes referred to as serpentine coils (S. Coil) (FIG. 1) in which mixing of the wastewater with various other water treatment agents is affected.

After the water has been mixed in the serpentine coils, it passes into the dissolved air flotation unit DAF (FIG. 1) where a number of water-clearing activities occur. However, just prior to entry of the wastewater into the DAF the water is injected with compressed air. The introduction of compressed air into the wastewater provides bubbles in the water which attach themselves to small water-borne crystals and flakes of material in the solution and make this material buoyant.

It is in the DAF that solids and grit settle out of solution and the air bubbles introduced into the wastewater lift the developing solid flakes or floc or flocculent particles and float the particles or floc to the surface. Once on the surface of the wastewater the floc can be skimmed-off the surface by rotating paddles which are dragged across the surface of the water to removed the floc as it gathers on the surface. By the time the wastewater has settled in the DAF, the reactions between the ozone/oxygen gas mixture and the water contaminants and the addition of the fine gas bubbles resulting from the ozone/oxygen mixture and the compressed air have achieved a substantial reduction in the biochemical oxygen demand (BOD) and other contaminants of the wastewater.

Referring now to FIG. 2 actual measured results of one installation of the method can be observed. Prior to the introduction to the system of the ozone/oxygen gas mixture the monthly averages for the five day biochemical oxygen demand ($BOD_5$) are shown for the months of January thru August. These months present a $BOD_5$ range of 411 mg/L to 218 mg/L. By contrast, upon the introduction of the ozone/oxygen gas mixture the monthly averages for the five day biochemical oxygen demand range from 183 mg/L to 197 mg/L.

Referring now to FIG. 3, the results of an additional test are shown. In the results of FIG. 3 the same water was tested both with and without the inventive treatment. The testing shows the change in biochemical oxygen demand (BOD), chemical oxygen demand (COD), ammonia ($NH_3$) and total nitrogen (TKN). In the case of the equalizing basin results, wastewater was withdrawn prior to and after the bubbling of the ozone/oxygen gas mixture into the equalizing basin wastewater. A comparison between the BOD of the FEB and FEB with Ozone shows a greater than 60% reduction in the determined BOD of the wastewater. Similar results were achieved for the chemical oxygen demand (COD) in which a 68% decrease was achieved. The results for total nitrogen (TKN) and ammonia ($NH_3$) were, respectively, reductions of 48% and 25%.

Still referring to FIG. 3 the results of water taken from the DAF, both with and without the inventive ozone treatment, are shown. The average reduction in the tested BOD between the DAF ozone treated wastewater the untreated wastewater was a 37% reduction in BOD. The reduction in the COD was a 24% reduction in chemical oxygen demand. The reduction for total nitrogen was 48% and the reduction for ammonia was 7.8%. Therefore, actual wastewater test results of FIG. 3 demonstrate substantial reductions in wastewater biochemical oxygen demand (BOD), chemical oxygen demand (COD), ammonia ($NH_3$) and total nitrogen (TKN) for wastewater treated with the inventive method.

An alternative embodiment of the invention involves bubbling the ozone/oxygen gas mixture into the wastewater of the first equalization basin and allowing mixing and reaction to take place in the equalization basin.

The preparation of the ozone/oxygen mixture is accomplished by directing compressed air into a pressure swing adsorption oxygen generator. The oxygen generator serves to concentrate the oxygen of the air to about 90%±10%. The high-concentration oxygen gas is then introduced into an ozone generation unit in which a low-concentration of about 1% to 3% ozone is added to the high-concentration oxygen gas mixture. The ozone/oxygen gas mixture generated thereby comprises a low-concentration ozone component representing, generally, less than 4% ozone in the mixture, a high-concentration oxygen component representing, generally, about 90% to 95% oxygen in the mixture and the remainder of the gas mixture is other gases. A full description of the efficient generation of the ozone component of the gas mixture is recited in U.S. Pat. No. 5,525,310 titled Continuous Corona Discharge Ozone Generation Device issued to Decker et al. and which is incorporated herein by reference thereto.

Calculations based upon the standard operation procedures of one test plant indicate that the following savings could be realized through use of the low-concentration ozone/oxygen method of treatment. In the absence of the ozone/oxygen method the wastewater treatment plant spends $541.50 (average daily cost) on anionic polymer and cationic polymer and coagulant in treating the wastewater. During the use of the ozone/oxygen treatment method the amount of these substances is significantly reduced. The chemical cost reduction resulting from lower consumption of these chemicals was $363.50 (average daily cost) for anionic polymer and cationic polymer and coagulant.

This cost reduction represents a savings of $178.00 per day in the amount paid for anionic and cationic polymers and coagulant chemicals. The annual savings represented by this cost reduction is calculated as follows:

| | | |
|---|---|---|
| $178.00 × 260 days = | $46,280.00 | |
| less | $182.00 | (annual electric for ozone/oxygen generation) |
| less | $60.00 | (annual parts and maintenance) |
| Annual Savings | $46,038.00 | |

Therefore, it can be seen that a substantial savings in chemical costs is achieved through using the inventive method to reduce the biochemical oxygen demand and chemical oxygen demand and ammonia and total nitrogen of wastewater through the injection or introduction of gas mixture having a low-concentration ozone component representing, generally, less than 4% ozone in the mixture and a high-concentration oxygen component representing, generally, about 90% of the mixture and allowing the gas mixture to react with the wastewater contaminants.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the improved, Low Concentration Ozone Wastewater Treatment Method is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of reducing the biochemical oxygen demand, chemical oxygen demand, ammonia and total nitrogen of wastewater comprising:

injecting at a position before a main water stream enters a transfer pump, a low-concentration ozone and high-concentration oxygen gas mixture into wastewater, said mixture having an ozone concentration of between about 1.0 weight percent and about 1.2 weight percent to form an ozone-wastewater stream, mixing, the gas mixture into the wastewater stream with said pump to form a mixed ozone-wastewater stream, and allowing the injected mixture to react with pollutants contained in the wastewater to reduce the biochemical oxygen demand, chemical oxygen demand, ammonia and total nitrogen of the wastewater.

2. The method as claimed in claim 1, wherein said gas mixture is comprised of between about 1.0 weight percent and about 1.2 weight percent ozone and about ninety-five weight percent oxygen.

3. The method as claimed in claim 1, wherein said gas mixture is comprised of between about 1.0 weight percent and about 1.2 weight percent ozone and about ninety percent oxygen.

4. The method as claimed in claim 1 wherein the gas mixture is injected into the wastewater by pulling the gas mixture into the wastewater as it passes through a venturi injector.

* * * * *